US009807397B2

(12) United States Patent
Deshpande et al.

(10) Patent No.: US 9,807,397 B2
(45) Date of Patent: Oct. 31, 2017

(54) SYSTEM FOR POWER ALLOCATION

(75) Inventors: Sachin G. Deshpande, Camas, WA (US); Louis Joseph Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 837 days.

(21) Appl. No.: 13/084,424

(22) Filed: Apr. 11, 2011

(65) Prior Publication Data

US 2012/0257870 A1    Oct. 11, 2012

(51) Int. Cl.
| | |
|---|---|
| *H04N 19/156* | (2014.01) |
| *H04N 19/172* | (2014.01) |
| *H04N 19/132* | (2014.01) |
| *H04N 19/44* | (2014.01) |
| *H04N 19/33* | (2014.01) |

(52) U.S. Cl.
CPC ......... *H04N 19/156* (2014.11); *H04N 19/132* (2014.11); *H04N 19/172* (2014.11); *H04N 19/33* (2014.11); *H04N 19/44* (2014.11)

(58) Field of Classification Search
CPC ...... H04N 19/156; H04N 19/44; H04N 19/13; H04N 19/132; H04N 21/4436
USPC ....................................................... 386/230
See application file for complete search history.

(56) References Cited

U.S. PATENT DOCUMENTS

| | | | | |
|---|---|---|---|---|
| 6,618,042 | B1 * | 9/2003 | Powell | ........................... 345/204 |
| 6,834,354 | B1 | 12/2004 | Togawa | |
| 2002/0054316 | A1 * | 5/2002 | Abe | ............................ 358/1.14 |
| 2003/0001815 | A1 | 1/2003 | Cui | |
| 2003/0033417 | A1 * | 2/2003 | Zou et al. | ..................... 709/230 |
| 2003/0051179 | A1 | 3/2003 | Tsirkel et al. | |
| 2004/0130556 | A1 | 7/2004 | Nokiyama | |
| 2004/0218670 | A1 * | 11/2004 | Lai | ......................... G09G 5/393 375/240.01 |
| 2005/0195901 | A1 * | 9/2005 | Pohjola et al. | .......... 375/240.24 |
| 2006/0015758 | A1 | 1/2006 | Yoon et al. | |
| 2006/0072672 | A1 * | 4/2006 | Holcomb et al. | ........ 375/240.25 |
| 2006/0222328 | A1 * | 10/2006 | Akahane | ......................... 386/83 |
| 2007/0188429 | A1 | 8/2007 | Yamaguchi et al. | |
| 2007/0230919 | A1 * | 10/2007 | Bourge et al. | ................ 386/109 |

(Continued)

FOREIGN PATENT DOCUMENTS

| | | |
|---|---|---|
| JP | 2008-311712 A | 12/2008 |
| JP | 2009-130860 A | 6/2009 |
| JP | 2009-217775 A | 9/2009 |

OTHER PUBLICATIONS

International Search Report, dated Jun. 26, 2012, in International Patent Application No. PCT/JP2012/060199, filed Apr. 10, 2012, Sharp Kabushiki Kaisha, 5 pgs.

(Continued)

*Primary Examiner* — Hung Dang
*Assistant Examiner* — Sunghyoun Park
(74) *Attorney, Agent, or Firm* — Chernoff Vilhauer McClung & Stenzel, LLP

(57) ABSTRACT

A battery powered device including power management includes a display, a processor, a video decoder, a networking circuit, and a power allocation process. The power allocation process modifies the power used to process a video by jointly selecting a lower power usage based upon selectively dropping frames to be decoded by the video decoder, and selectively decreasing the illumination of a backlight of the display.

17 Claims, 4 Drawing Sheets

(56) References Cited

U.S. PATENT DOCUMENTS

| | | | |
|---|---|---|---|
| 2007/0296854 A1* | 12/2007 | Berkey et al. | 348/412.1 |
| 2008/0062018 A1* | 3/2008 | Normile | H04N 19/156 341/50 |
| 2008/0119242 A1* | 5/2008 | Cho | G06F 1/3203 455/574 |
| 2008/0151130 A1 | 6/2008 | Van Gassel et al. | |
| 2008/0225900 A1* | 9/2008 | Henriksson et al. | 370/509 |
| 2010/0046637 A1* | 2/2010 | Raveendran | H04N 21/4348 375/240.26 |
| 2011/0066673 A1* | 3/2011 | Outlaw | 709/203 |
| 2011/0310956 A1* | 12/2011 | Lin | H04N 21/44004 375/240.02 |

OTHER PUBLICATIONS

P. Chou et al., Rate-Distortion Optimized Streaming of Packetized Media, IEEE Trans. on Multimedia, Published Apr. 2006, pp. 1-16.

W. Yuan et al., Practical Voltage Scaling for Mobile Multimedia Devices, ACM Multimedia 2004, 8 pgs.

W. Yuan et al., Energy Efficient Soft Real-time CPU Scheduling for Mobile Multimedia Systems, Proc. 19th Symposium on OS Principles, Oct. 2003, 15 pgs.

J. Pouwelse et al., Power-Aware Video Decoding, Proc. of Picture Coding Symposium 2001, 4 pgs.

L. Kerofsky, Feedback Based Power Management for LCD Backlight Modulation for Guaranteed Average Levels of Power Consumption, Proc. IDW-2009, 4 pgs.

M. Ruggiero et al., DBS4video: Dynamic Luminance Backlight Scaling Based on Multi-Histogram Frame Characterization for Video Streaming Application, Proc. International Conference on Embedded Systems, 2008, pp. 109-118.

L. Cheng et al., Quality Adapted Backlight Scaling (QABS) for Video Streaming to Mobile Handheld Devices, IEEE 4th International Conference on networking, 2005, 9 pgs.

Y.F. Ou et al., Modeling the Impact of Frame Rate on Perceptual Quality of Video, in Proc. of ICIP, 2008, 4 pgs.

Y.F. Ou et al., A Novel Quality Metric for Compressed Video Considering Both Frame Rate and Quantization Artifacts, in Proc. of Intl. Workshop Video Processing and Quality Metrics for Consumer (VPQM), Scottsdale, AZ, Jan. 2009, 6 pgs.

\* cited by examiner

POWER CONSUMPTION MEASUREMENTS ON A
MULTIMEDIA DEVICE FOR VARIOUS COMPONENTS

POWER CONSUMPTION MEASUREMENTS AT
DIFFERENT BRIGHTNESS LEVELS

SYSTEM FOR POWER ALLOCATION

CROSS-REFERENCE TO RELATED APPLICATIONS

Not applicable.

BACKGROUND OF THE INVENTION

The present invention relates generally to a system for power management of devices with limited available power.

Battery powered televisions and mobile devices are commonly used device for receiving and/or displaying video content. The audio-video content is typically in the form of an encoded communication over a broadcast channel, such as over the air, a cable connection, or other data connection. In some cases, the audio-video content is stored locally with the device. The video content is displayed on the display and the audio content is provided through associated speakers. Unfortunately, the presentation of the audio-video content to the viewer has a limited duration due to the power capabilities of the associated battery.

What is desired is a device capable of displaying audio-video content with effective power management.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
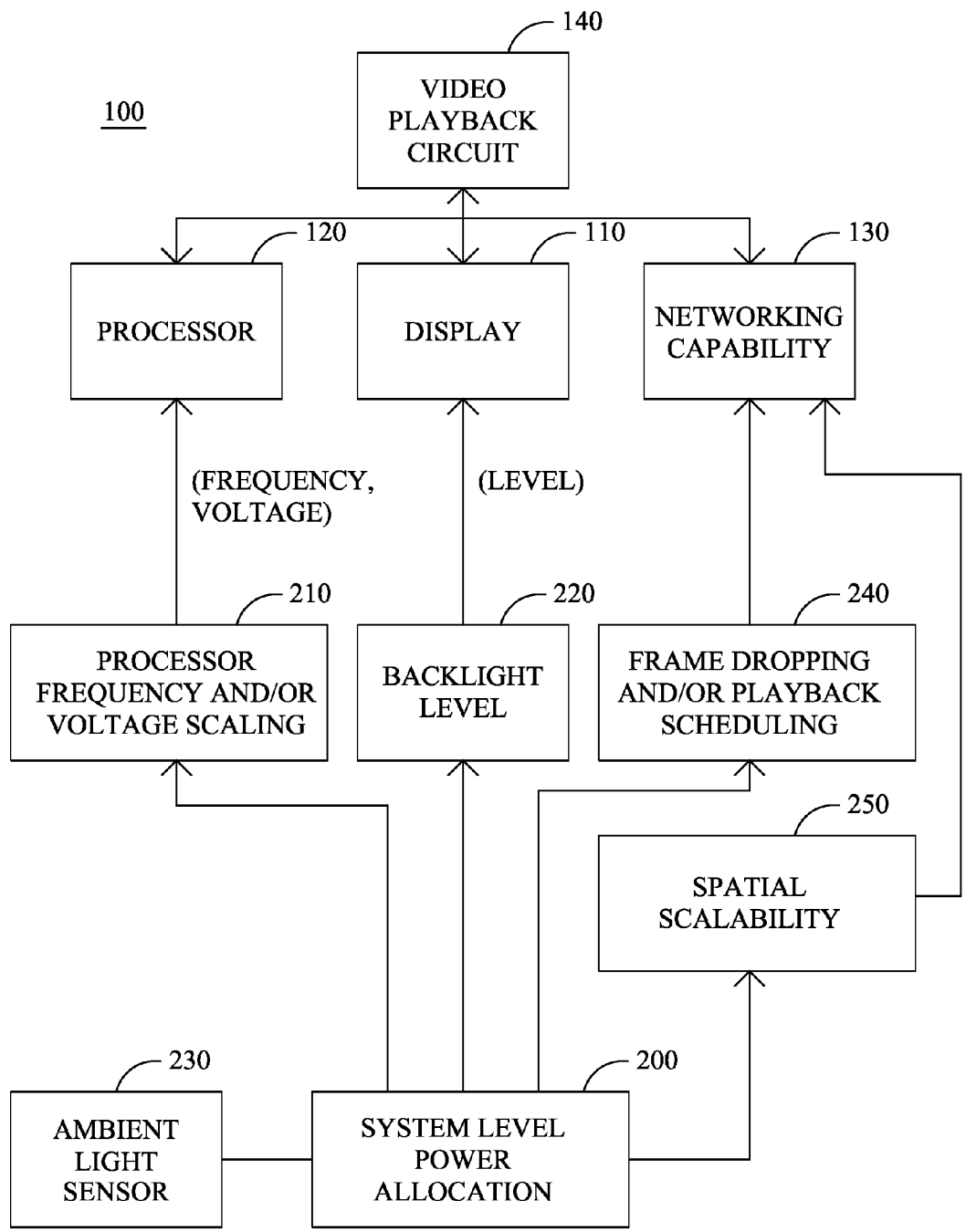
FIG. 1 illustrates system level power allocation.

Referring to FIG. 1, a video device 100, such as a battery powered television or a battery powered mobile device, includes a display 110 which may be used to display video content. The display 110 typically includes a backlight which consumes a significant amount of power that limits the playback duration of video content. The device 100 may also include speakers to provide an audio output. The audio-video content may be received by an antenna. The audio-video source may be, for example, a digital video player, a VHS player, a cable connection, an Internet connection, a wireless connection, a memory card, storage internal to the device 100, or any other source.

The device 100 may also include a processing unit 120, such as a general purpose processor or a special purpose processor. The processing unit 120 consumes a significant amount of power which limits the playback duration of video content. The device 100 may also include networking capability 130 to receive streaming audio-video content, such as from a local storage device or a network based source. The networking capability 130, such as cellular or wireless, also consumes a significant amount of power which limits the playback duration of video content. Also in many cases a video playback circuit 140, which may be included within the processing unit 120, is used to decode and play the video on the display 110. In addition the video playback circuit 140 consumes a significant amount of power which limits the playback duration of video content.

The device 100 may include a system level power allocation 200. The power allocation 200 may adjust the characteristics of the significant power consuming devices used in conjunction with video presentation in a manner that maintains a sufficient image quality while extending the duration over which the video may be presented. The power allocation 200 may select a processor frequency and/or voltage scaling 210. The processor frequency and/or voltage scaling 210 may adjust the power consumed by the processor 120 by modifying its operating frequency and/or scaling the voltage used by the processor. As the voltage being used by the processor and/or the operating frequency is reduced, the amount of power consumed by the processor 120 is likewise reduced. This reduction in the power usage may be used to increase the playback duration of video content.

The power allocation 200 may select a backlight level 220 for the display 110. The backlight level 220 may be selected such that a lower backlight emission is used by the display 110. In some cases, the backlight level 220 may be selected, at least in part, based upon an ambient light sensor 230. The display 110 may be dimmer when the ambient light level is lower, while maintaining a relatively good video image quality. As the backlight level being used by the display 110 is reduced, the amount of power consumed by the display 110 is likewise reduced. This reduction in the power usage may be used to increase the playback duration of video content.

In the case of liquid crystal displays, the transmission of the liquid crystal layer may be increased while the backlight is reduced, from what it would have otherwise been. In this manner, the brightness of the display may remain relatively high while maintaining a similar image quality for the video content. This may likewise reduce power consumption during video content playback.

The power allocation 200 may select frame dropping and/or playback scheduling 240. Often hardware decoding is used for the video decoding, which requires substantial power. Each frame of the video has an associated deadline, and each frame must be decoded and displayed before its deadline to ensure a smooth video playback. The video may be analyzed off-line or on-line, and the frequency of the processor 120 may be scaled depending the complexity. In addition, it may be desirable to drop video frames (the playback may thus display the same frame for an extended duration), either at the server or at the device 100. This may result in relatively good video quality, while reducing the power usage.

The power allocation 200 may select spatial scaling 250. The spatial scaling may select among different resolutions of the video. The lower the resolution, the less power that is used by the device 100.

The power allocation 200 may switch to a lower bitrate stream for the same video content. Typically the lower the bitrate, the less power is used by the device 100.

The system level power allocation 200 may use a joint function to determine the appropriate settings for the different primary power usage device to selectively increase the video playback duration. The length of the playback may be selected based upon the anticipated available power. Also, the duration of the video may be used as the basis to adjust the power usage to ensure sufficient power will be available for the entire video duration.

To determine the appropriate settings, a quality score as a function of video frame rate ($u_1(f)$) may be determined. As the frame rate decreases compared to a nominal frame rate, the subjective quality of the video decreases. A normalized Mean Opinion Score (MOS) variation with frame rate is generally independent of the quantization parameter. A subjective quality as a function of video frame rate may be defined as:

$$MOS(f) = Q_{max} \frac{1 - e^{\frac{-cf}{f_{max}}}}{1 - e^{-c}}$$

The system may define a utility function which maps the MOS to a range of [0,1]. The utility function which provides a quality score as a function of frame rate may be:

$$u_1(f) = \frac{MOS(f)}{100}$$

Figure 2:
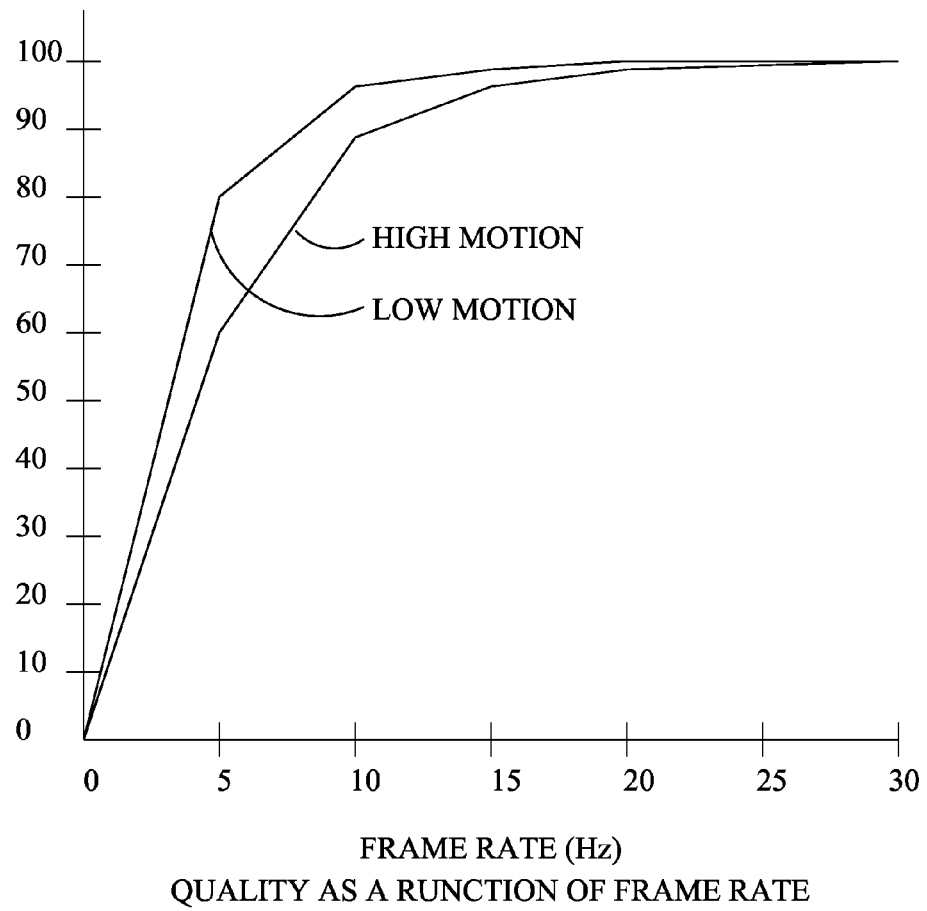
FIG. 2 illustrates quality as a function of frame rate.

The system may further categorize the video content into two categories (low motion, high motion). FIG. 2 illustrates the quality function (MOS) as a function for these two cases. Additional categories (e.g. medium motion) may be utilized, as desired. The classification of a video content into low motion and high motion may be done using any suitable technique. In particular the system may utilize the motion vector information from bit stream during decoding process to make the classification.

The energy required as a function of processor frequency and voltage may be empirically determined. The significant power consuming components of the overall system may include: idle power, display power, decoding power, networking/streaming power. To identify the power consumption of each of these components a series of measurements on a device as an off-line step where one component is added at a time may be performed. The measurements may be repeated at different CPU frequencies/voltages.

Figure 3:
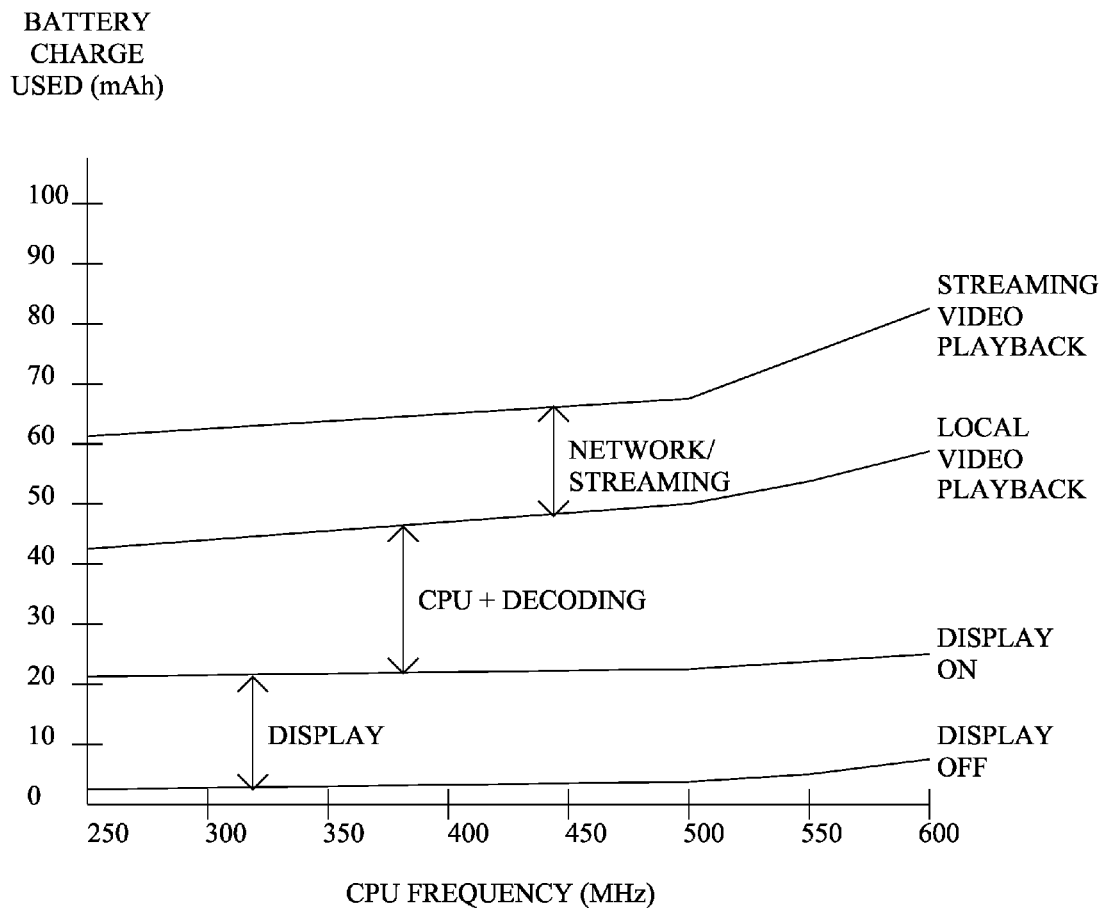
FIG. 3 illustrates power consumption for various components.

FIG. 3 illustrates the power consumption at different CPU frequencies for a smart phone device. The measurements are fitted to a parametric model or are stored as a look up table. A model fit may be obtained by modeling the dynamic power P as a function of the frequency g and voltage V as:

$$P = E * g * V^2$$

where E is a constant.

Figure 4:
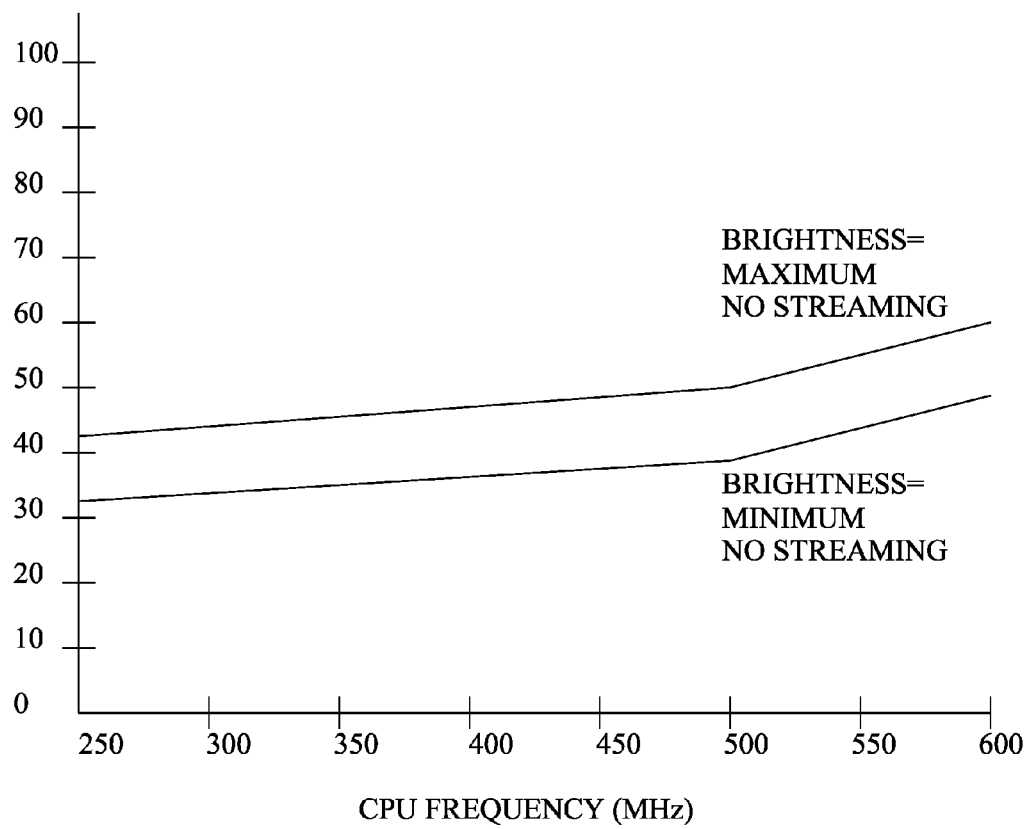
FIG. 4 illustrates power consumption at different brightness levels.

Additional measurements may be conducted for each component at different levels. As an example display brightness can be set to different levels, the video with different frame rates for the same content can be received by streaming and played back. As an example FIG. 4 illustrate measurements with display brightness set to two different levels. Then energy consumption at different CPU frequencies ($e(f_i, b_j, g_k)$) for different frame rates and different backlight levels is measured.

$$L(i) = [l_1 l_2 l_3 \ldots l_R]$$

An optimal playback pattern for a given frame rate (f) may be characterized. Given a frame rate f, the system can utilize a power aware playback scheduling technique to determine the optimal frame playback pattern. A summary of a playback technique may be as follows.

Playback Pattern: Let be a playback pattern vector where $$L(i) = [l_1 \ l_2 \ l_3 \ldots l_R]$$

$$l_k = \begin{cases} 0 & \text{if frame } fr_k \text{ is dropped} \\ 1 & \text{otherwise} \end{cases}$$

Optimized Playback Scheduling: For each playback pattern L(i) there is:

Expected power consumption $P_{L(i)}$

Expected video quality distortion $D_{L(i)}$

Determine optimized playback pattern by minimizing the cost function:

$$\min_{L(i)} [D_{L(i)} + \lambda P_{L(i)}]$$

Expected Power Consumption: Let the processor support frequencies $[g_1, g_2, \ldots, g_T]$ and voltages $[V_1, V_2, \ldots, V_Q]$ then dynamic power used at a frequency $g_j$ and voltage $V_q$ is $P_{j,k} = E * g_j * V_q^2$. Then $P_{L(i)}$ may be determined by considering contribution from each frame, i.e.

$$P(L(i)) = \sum_k P(L(i))_k$$

Expected Distortion: Expected Distortion $D_{L(i)}$ can be modeled for frame playback pattern L(i) as follows $$D_{L(i)} \approx D_0 - \sum_k \Delta D(l_k)$$

$D_0$ is the distortion if none of the frames is played back, $\Delta D(l_k)$ is expected reduction in distortion if frame k is not dropped in playback pattern L(i) and decoded before its playback deadline.

Backlight/Brightness function: The user can set the brightness level to any setting in the set $[b_{min}, \ldots, b_{max}]$. Let the user selected brightness be indicated by $b_u$. The system may define a quality function $u_2(b_u, b_{mod})$ as a function of the user selected brightness $b_u$ and the device selected modified brightness level $b_{mod}$. One example quality function can be defined as:

$$u_2(b_u, b_{mod}) = \min\left(1, \frac{b_{mod}}{b_u}\right)$$

In other embodiments alternative quality functions may be used in place of the above quality function $u_2$.

Given a user selected brightness level, the system will select a modified brightness level depending upon the user selected level and the present energy state and optimization based on the quality function. The power allocation system will supply the modified brightness level to the backlight selection unit. The backlight selection unit will select the level used for the backlight, and hence actual power consumption, based on the modified brightness level and the image content. Depending upon the content, the final level sent to the backlight may be lower than that corresponding to the modified brightness setting. In such cases, the actual energy consumption will be less than predicted based on the modified brightness level. This lower energy consumption will influence the system operation through feedback which tracks the battery state.

The system level power allocation may be characterized as follows:

B=Available battery charge information (in mAh).
T=Media playback duration (in minutes) (or user specified duration for the total media playback).
L=Ambient light level information.

The allocation computes the budget for battery charge consumption per time unit (e.g. minute):

$$R = \frac{B}{T}$$

This module may use the following pre-computed information.

```
foreach CPUFrequency [ g₁,...,g_r]
    foreach Brightness [ b₁,...,b_m]
        foreach FrameRate [ f₁,...,f_p]
            Store (u₁(f_i,g_k))
            Store (u₂(b_j,g_k))
            Store (e(f_i,b_j,g_k))
        end
    end
end
```

Where $u_1(f_i, g_k)$ is the value of the utility function at the frame rate $f_i$ and at CPU frequency $g_k$, $u_2(b_j, g_k)$ is the value of the utility function at the brightness setting $b_j$ and at CPU frequency $g_k$, $e(f_i, b_j, g_k)$ is the estimated energy consumption (in mAh/min) at the frame rate $f_i$, at the brightness setting $b_j$ and at CPU frequency $g_k$. This may be obtained as described in the energy as a function of processor frequency and voltage previously described.

At certain CPU frequencies a particular frame rate video may not be playable in real-time. In this case the utility function is assigned a zero value ($u_1(f_i, g_k)=0$). In some embodiments additionally the energy estimate may be assigned infinite (or very high) value to avoid selecting that operating point ($e(f_i, b_j, g_k)=\infty$).

In some embodiment the table may be computed on the fly. Further more this table may be modified in real-time for the particular media being played back by utilizing a feedback regarding the actual energy consumption during playback and comparing it with the estimated energy consumption. Then the technique utilizes the input information to search the values of $e(f_i, b_j, g_k)$ and select the frequency and brightness/backlight which maximizes the utility function (quality function) while meeting the energy constraint:

```
u^s = 0
foreach CPUFrequency [g₁,...,g_T]
    foreach Brightness [b₁,...,b_m]
        foreach FrameRate [f₁,...,f_p]
            if(e(f_i,b_j,g_k) < R)
                if(u₁(f_i,g_k) * u₂(b_j,g_k) > u^s)
                    f^s = f_i
                    b^s = b_j
                    u^s = u₁(f_i,g_k) * u₂(b_j,g_k)
                end
            end
        end
    end
end
```

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A battery powered device including power management comprising:
   (a) a display;
   (b) a processor;
   (c) a video decoder that decodes a bitstream;
   (d) a networking circuit;
   (e) a power allocation system in said decoder that, independent of prior changes in said bitstream through said decoder, selectively lowers power usage by dropping frames using one of a plurality of predetermined patterns automatically selected by said decoder, each of said plurality of patterns stored in memory accessible to said decoder and drop frames when selected for use by said decoder, where selection of one of said plurality of predetermined patterns prevents the use of each other of said plurality of predetermined patterns while the selected one said plurality of predetermined patterns is used to drop frames.

2. The device of claim 1 wherein said power allocation system further selects said lower power usage based upon at least one of a frequency and voltage scaling for said processor.

3. The device of claim 1 wherein said power allocation system further selects said lower power usage based upon playback scheduling.

4. The device of claim 1 wherein said power allocation system further selects said lower power usage based upon spatial scalability.

5. The device of claim 1 wherein said power allocation system further selects said lower power usage based upon guaranteed video playback for a selected duration based upon available battery power.

6. The device of claim 1 wherein said power allocation system further selects said lower power usage based upon selectively enabling said networking circuit.

7. The device of claim 1 wherein said video decoder is included together with said processor.

8. The device of claim 1 wherein said power allocation system further selects said lower power usage based upon a lower bitrate for said video.

9. The device of claim 1 wherein said power allocation system is based upon a quality function.

10. The device of claim 9 wherein said quality function is selectable by a user.

11. The device of claim 10 wherein said quality function is generally based upon $$MOS(f) = Q_{max} \frac{1 - e^{\frac{-cf}{f_{max}}}}{1 - e^{-c}}.$$

12. The device of claim 9 wherein said quality function is based upon a backlight level of said display.

13. The device of claim 12 wherein said quality function is generally based upon $$u_2(b_u, b_{mod}) = \min\left(1, \frac{b_{mod}}{b_u}\right).$$

14. The device of claim 1 wherein said power allocation system is based upon a classification of said video as a low motion video and high motion video.

15. The device of claim 1 where said pattern is chosen by minimizing a cost expressed as a function of vectors associated with each of said plurality of patterns.

16. The device of claim 15 where said cost function is expressed a sum of a distortion and a power usage, each expressed as a function of said vectors.

17. The device of claim 1 where each of said plurality of patterns stored in memory, when used by said power allocation system, determines a sequence of frames received by said decoder, each frame in said sequence preselected by said respective pattern as a specified one of a frame to drop and a frame to not drop.

* * * * *

UNITED STATES PATENT AND TRADEMARK OFFICE
CERTIFICATE OF CORRECTION

PATENT NO. : 9,807,397 B2
APPLICATION NO. : 13/084424
DATED : October 31, 2017
INVENTOR(S) : Sachin G. Deshpande and Louis Joseph Kerofsky Page 1 of 1

It is certified that error appears in the above-identified patent and that said Letters Patent is hereby corrected as shown below:

In the Drawings

FIG. 2:
Change "QUALITY AS A RUNCTION OF FRAME RATE" to read --QUALITY AS A FUNCTION OF FRAME RATE--.

In the Specification

Column 7, Line 8:
Change "expressed a sum" to read --expressed as a sum--.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*